United States Patent Office 3,551,349
Patented Dec. 29, 1970

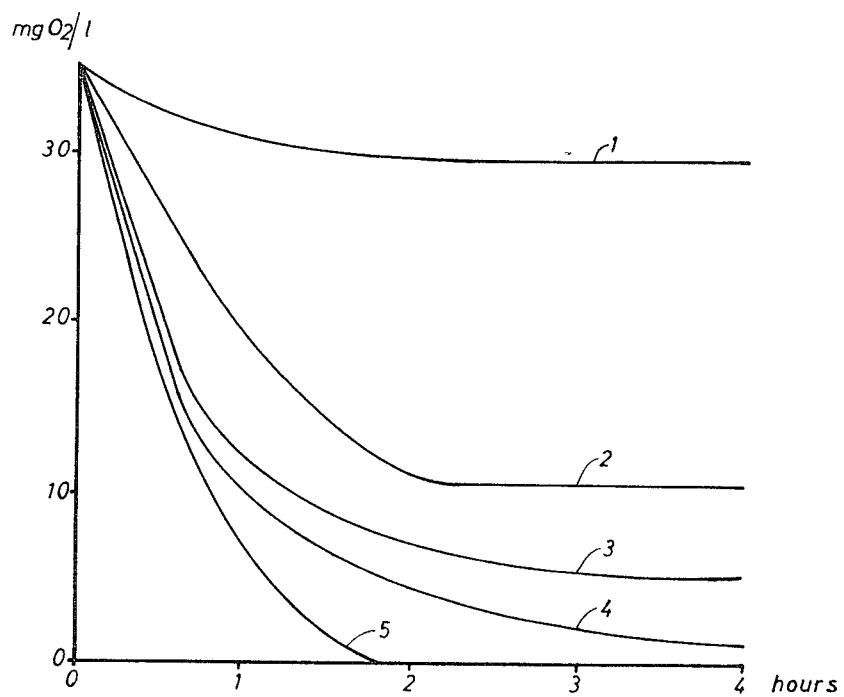

3,551,349
COMPOSITION FOR INHIBITING CORROSION CONTAINING A HYDRAZINE AND A QUINONE
Herbert Kallfass, Cologne-Stammheim, Germany, assignor to Farbenfabriken Bayer Aktiengesellschaft, Leverkusen, Germany, a corporation of Germany
Filed Aug. 11, 1967, Ser. No. 659,959
Claims priority, application Germany, Dec. 14, 1966, F 50,928
Int. Cl. C23f *11/12, 11/18*
U.S. Cl. 252—392                8 Claims

ABSTRACT OF THE DISCLOSURE

Aqueous corrosion protection composition containing a mixture of aqueous hydrazine, e.g. used in the form of 24% hydrazine hydrate, and a water-soluble o- or p-quinone compound in the ratio by weight of the quinone compound to hydrazine, i.e., $N_2H_4$, of between about 1:15–1500, usable in quiescent and running bodies of water in metal containers such as vessels and pipe systems to protect the metal components of such containers against corrosion caused by oxygen present in the water.

---

This invention relates to a process for inhibiting corrosion by means of a hydrazine preparation and is concerned with the protection against corrosion of metal surfaces in sealed vessels and pipe systems containing water.

It is known that corrosion affecting industrial plants such as steam boilers, long distance supply heating systems and hot-water heating systems, can be inhibited by adding hydrazine to the water present therein. The explanation generally given for the effect of this additive is that it combines with the oxygen dissolved in the water. In addition, it may be assumed that the hydrazine promotes the formation of an impermeable, firmly adhering protective layer of magnetite over iron surfaces.

Since, however, the rate at which hydrazine reacts with oxygen at room temperature is extremely low, the corrosion-inhibiting effect, in particular on polished metal surfaces without an $Fe_3O_4$— layer, is unsatisfactory below 60° C., especially when chlorides or sulphates are dissolved in the water. For this reason, it has already been proposed to add activators which greatly accelerate the rate at which oxygen is combined at room temperature. A synergistic combination of methylene blue and

has recently proved to be eminently suitable for this purpose, even on polished metal in concentrated salt-containing solutions, but unfortunately is limited in its effectiveness to special cases such as the wet preservation of still water-circulation systems and closed coolant circuits. It has been found that the aforementioned combination cannot be used for plants run continuously at relatively high water temperatures for the following reasons:

The cyanide is not stable so that elementary copper can be precipitated, in some cases even at temperatures as low as 40° C., depending on the hydrazine excess. In power stations, however, copper is an undesirable material for a number of reasons. The maximum permissible copper content of the water used to feed the high-pressure boilers is $3.10^{-6}$ g. of copper per litre. In some cases, legal restrictions, too, prohibit the use of cyanogen compounds.

The methylene blue is used in the form of its hydrochloride. In some cases, however, the steam circuit is contaminated by chlorides. In addition, half the commercial hydrazine preparation activated in the manner described, consists of isopropanol in order to keep in solution the leucomethylene blue formed as a result of reduction by hydrazine. This not only increases the financial outlay involved but also gives rise to metering difficulties during the continuous admixture cycle because arbitrary dilution with water is not possible on account of the danger of flocculation.

We have now found that the disadvantages and restrictions referred to above can be obviated by a process for protecting metals against corrosion in vessels containing water by means of hydrazine and an additive by which it is activated, using one of the known water-soluble o- or p-quinone compounds as the activating additive in a ratio by weight to $N_2H_4$ of from 1:1500 to 1:15, and preferably from 1:150 to 1:30.

Examples of compounds such as these include o- and p-quinone, naphthoquinones, anthraquinones and their derivatives, particularly those with hydrophilic substituents, above all carboxylic acid and sulphonic acid, and their alkali metal salts such as potassium-1,2-naphthoquinone-4-sulphonic acid, sodium-9,10-anthraquinone-2-sulphonic acid and 1-nitro-9,10-anthraquinone-2-carboxylic acid. It is of advantage to add these compounds to the hydrazine hydrate solution in the hydroxyl form, as pyrocatechol, hydroquinone and so on, particularly when preparing a commercial preparation containing for example 24% by weight of hydrazine hydrate (=15% $N_2H_4$), in order to prevent the quinones from reacting with the hydrazine, a reaction which would be accompanied by the evolution of heat and gas in addition to partial consumption of the hydrazine.

It may be assumed that the quinone compounds used as activators in accordance with the invention act as true catalysts which absorb the hydrogen in the hydrazine more quickly than the hydrazine itself reacts, transferring it to the oxygen dissolved in the water.

The activating effect is shown in the accompanying graph with reference to four examples. The preparations used contained 3 g. of the activator indicated in 1 litre of an aqueous solution containing 24% by weight of hydrazine hydrate, and were diluted with water of condensation oversaturated with oxygen to a content of 0.15 g. of $N_2H_4$ per litre: pH=9.5, temperature=20° C. The curves show the oxygen content of the samples which decreases from an initial value of 35 mg./litre in dependence upon the observation time, whereby curve 1 shows the test without addition of an activating substance, whereas curves 2–5 show tests indicating the removal of oxygen with activated hydrazine: curve 2 with addition of 1-nitroanthraquinone-(9,10)carbonic-acid-(2), curve 3 with addition of naphthoquinone-(1,2)-sulphonic-acid-(4)-K, curve 4 with the addition of anthraquinone-(9,10)-sulphonic-acid-(2)-Na, curve 5 with the addition of benzoquinone-(1,4).

Generally, the aqueous mixture is in the form of an aqueous solution having a concentration of between about 150 to 640 grams of $N_2H_4$ per liter of water together with the quinone compound, and such mixture is used in an effective amount in the water to be treated sufficient to provide a concentration of between about 0.0001 to 3.0 grams of $N_2H_4$ per liter of water and a concentration of between about $1.10^{-6}$ to $1.10^{-2}$ grams of the quinone activator compound per liter of water.

Preferably, the aqueous mixture consists of an aqueous solution of about 24% by weight hydrazine hydrate and between about 0.01–1% by weight of said quinone compound. In particular, the quinone compounds contemplated include o- and p-quinones, -naphthoquinones, and -anthraquinones, as well as the corresponding substituted quinone compounds which are substituted with one or more hydrophilic groups such as carboxylic acid, sulfonic acid, carboxylic or sulfonic acid alkali metal salt (e.g.

sodium, potassium, etc.), and/or nitro groups, and mixtures of the foregoing.

As used herein, i.e. both in the specification and claims, as the case may be, the term "quinone compound" is meant to include not only the mononuclear form of o- and/or p-quinone but also the di- and tri-nuclear dione forms of o- and/or p-naphthoquinone and anthraquinone, contemplating both the free "one" form as well as the "hydroxyl" form, and not only the unsubstituted forms but also the substituted forms of such quinone compounds which are water-soluble, i.e. which contain inherently hydrophilic substituents in keeping with the water-soluble requirement of the quinone compound for use with the hydrazine component to provide the corrosion protection environment desired.

Also, as used herein, i.e. both in the specification and claims, as the case may be, the terms "water" and "bodies of water" as contemplated by the oxygen-containing water, with respect to which protection against corrosion is sought, are intended to include not only water in liquid form but also water in vapor form, including steam and aqueous salt solutions for cooling systems. In this way, corrosion protection of the metal surfaces to be protected will be attained by maintaining the instant aqueous mixture in such "water" or "bodies of water" or in intimate association therewith, depending upon the existing environmental and/or ambient conditions, such as temperature of 0 and 650° C. and pressures of up to 400 atm.

It will be appreciated that the instant specification and drawing are set forth by way of illustration and not limitation, and that various modifications and changes may be made without departing from the spirit and scope of the present invention which is to be limited only by the scope of the appended claims.

What is claimed is:

1. Corrosion protection composition for protecting metal surfaces against corrosion caused by bodies of water in contact therewith, which consists essentially of an aqueous mixture of an aqueous solution of hydrazine and a water-soluble quinone compound selected from the group consisting of o- and p-quinones, -naphthaquinones, -anthraquinones, such corresponding quinone compounds which are substituted with substituents individually selected from the group consisting of carboxylic acid, sulfonic acid, carboxylic acid alkali metal salt, sulfonic acid alkali metal salt and nitro, and mixtures of said compounds, in the ratio by weight of such quinone compound to $N_2H_4$ of between about 1:1500 to 1:15.

2. Composition according to claim 1 wherein said aqueous mixture consists of an aqueous solution of about 24% by weight hydrazine hydrate and between about 0.01–1% by weight of said quinone compound.

3. Composition according to claim 2 wherein said quinone compound is in the corresponding hydroxyl form.

4. Composition according to claim 2 wherein said quinone compound is selected from the group consisting of potassium-1,2-naphthoquinone-4-sulfonic acid, sodium-9,10-anthraquinone-2-sulfonic acid, and 1-nitro-9,10-anthraquinone-2-carboxylic acid.

5. Method of using the compound according to claim 1 for protecting metal surfaces against corrosion caused by bodies of water in contact therewith, which consists essentially of maintaining in such water in contact with such metal surfaces an effective amount of an aqueous mixture of an aqueous solution of hydrazine and a water-soluble quinone compound selected from the group consisting of o- and p-quinones, -naphthaquinones, -anthraquinones, such corresponding quinone compounds which are substituted with substituents individually selected from the group consisting of carboxylic acid, sulfonic acid, carboxylic acid alkali metal salt, sulfonic acid alkali metal salt and nitro, mixtures of said compounds, in the ratio by weight of such quinone compound to $N_2H_4$ of between about 1:1500 to 1:15 sufficient to provide a concentration of hydrazine of between about 0.0001 to 3.0 grams/liter of water and a concentration of such quinone compound of between about $1.10^{-6}$ to $1.10^{-2}$ grams/liter of water.

6. Method according to claim 5 wherein said aqueous mixture consists of an aqueous solution of about 24% by weight hydrazine hydrate and between about 0.01–1% by weight of said quinone compound.

7. Method according to claim 5 wherein said quinone compound is in the corresponding hydroxyl form.

8. Method according to claim 6 wherein said quinone compound is selected from the group consisting of potassium-1,2-naphthoquinone-4-sulfonic acid, sodium-9,10-anthraquinone-2-sulfonic acid, and 1-nitro-9,10-anthraquinone-2-carboxylic acid.

References Cited

UNITED STATES PATENTS 3,277,120  10/1966  Fullhart et al. _____ 252—393

MAYER WEINBLATT, Primary Examiner

I. GLUCK, Assistant Examiner

U.S. Cl. X.R.

21—2.7; 252—390, 393, 396; 260—396